United States Patent
Ranck et al.

(10) Patent No.: US 9,871,674 B2
(45) Date of Patent: Jan. 16, 2018

(54) BRIDGING BETWEEN DIFFERING COMMUNICATION BUSES

(71) Applicant: INTERNATIONAL BUSINESS MACHINES CORPORATION, Armonk, NY (US)

(72) Inventors: Andrew R. Ranck, Sunnyvale, CA (US); Mushfiq U. Saleheen, Poughkeepsie, NY (US); Jie Zheng, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 124 days.

(21) Appl. No.: 14/871,446

(22) Filed: Sep. 30, 2015

(65) Prior Publication Data

US 2017/0093597 A1    Mar. 30, 2017

(51) Int. Cl.
| | |
|---|---|
| *H04L 12/26* | (2006.01) |
| *H04L 12/46* | (2006.01) |
| *H04L 12/40* | (2006.01) |
| *H04L 12/861* | (2013.01) |
| *G06F 13/40* | (2006.01) |

(52) U.S. Cl.
CPC .............. *H04L 12/46* (2013.01); *H04L 12/40* (2013.01); *H04L 49/90* (2013.01); *G06F 13/4027* (2013.01)

(58) Field of Classification Search
CPC ............ G06F 13/4027; G06F 13/4059; G06F 13/405; G06F 13/4045; G06F 9/3855; Y02B 60/1235; H04L 12/40

USPC .......................... 710/310, 110, 313, 314, 315
See application file for complete search history.

(56) References Cited

U.S. PATENT DOCUMENTS

| | | | |
|---|---|---|---|
| 8,489,794 B2 | 7/2013 | Byrne et al. | |
| 2011/0055439 A1* | 3/2011 | Chen .................. | G06F 13/4027 710/57 |
| 2012/0005391 A1* | 1/2012 | Byrne ................. | G06F 13/4027 710/313 |
| 2015/0019193 A1 | 1/2015 | Boutillier et al. | |

OTHER PUBLICATIONS

IBM, "z/Architecture—Principles of Operation," SA22-7832-10, Eleventh Edition, Mar. 2015, pp. 1-1732.

* cited by examiner

*Primary Examiner* — Marsha D. Banks Harold
*Assistant Examiner* — Elton Williams
(74) *Attorney, Agent, or Firm* — Steven Chiu, Esq.; Blanche E. Schiller, Esq.; Heslin Rothenberg Farley & Mesiti P.C.

(57) ABSTRACT

Communication between one communication bus having one set of characteristics and another communication bus having another set of characteristics is facilitated by a bridge coupling the two communication buses. The bridge includes a scoreboard to manage data communicated between the buses. In one particular example, the one communication bus is a Processor Local Bus (PLB6) and the other communication bus is an Application Specific Integrated Chip (ASIC) Interconnect Bus (AIB).

20 Claims, 8 Drawing Sheets

BRIDGING BETWEEN DIFFERING COMMUNICATION BUSES

BACKGROUND

One or more aspects relate, in general, to communication within a computing environment, and in particular, to communicating between communication buses of the computing environment.

Communication between communication buses may be complex, and for some types of buses, it has not been possible. In particular, communication between multiple application specific integrated circuit (ASIC) system buses is a problem in the industry, and for some types of ASIC buses, there has been no way to perform the communication.

SUMMARY

Shortcomings of the prior art are overcome and additional advantages are provided through the provision of a method of communicating between communication buses of a computing environment. The method includes receiving, by a bridge implemented at least in part in hardware, a request, the bridge coupled between one communication bus having a first set of characteristics and another communication bus having another set of characteristics different from the one set of characteristics; determining by the bridge whether the request is to be processed; based on determining the request is to be processed, initiating processing of the request; storing data associated with the request in a buffer; and controlling access to the data by the other communication bus, the controlling access including: determining whether the other communication bus is to have access to the data in the buffer; based on determining the other communication bus is to have access to the data, providing the other communication bus with access to the data; and based on determining the other communication bus is not to have access to the data, preventing access to the data via an empty indication of the buffer regardless of whether the buffer is empty.

Systems and computer program products relating to one or more aspects are also described and may be claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

According to one or more aspects, a capability is provided to bridge one communication bus (also referred to herein as a bus or a system bus) with another communication bus. The bridging includes employing a scoreboard to manage data communicated between the buses. In one particular example, the one communication bus is a Processor Local Bus (e.g., PLB6) and the other communication bus is an Application Specific Integrated Chip (ASIC) Interconnect Bus (AIB).

One example of a computing environment including such buses is described with reference to FIG. 1. Although aspects of the invention are described with reference to PLB6 and AIB, one or more aspects may be used with one or more other types of communication buses. PLB6 and AIB are just two examples.

Figure 1:
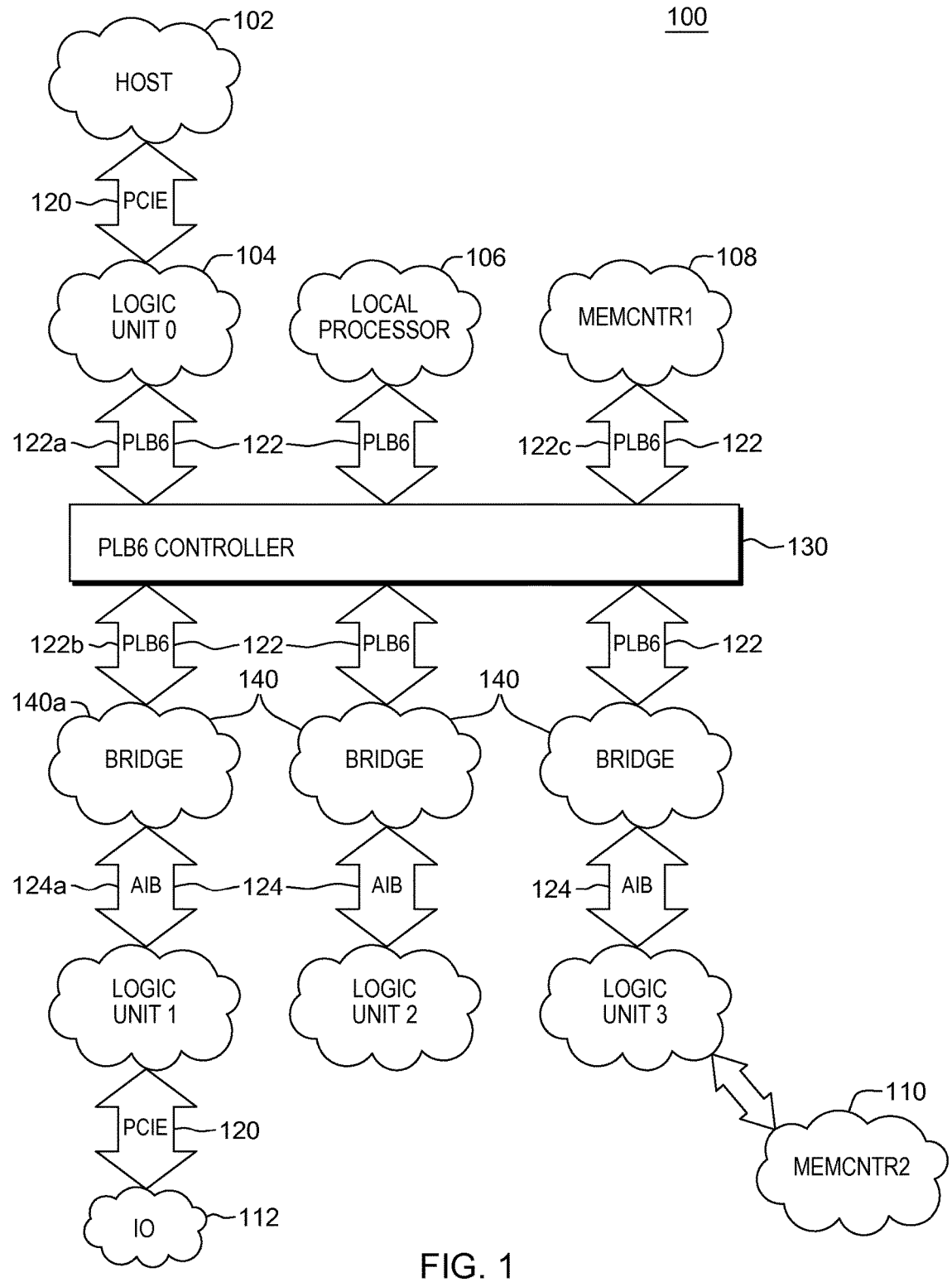
FIG. 1 depicts one example of a computing environment to incorporate and use one or more aspects of the present invention.

Referring to FIG. 1, a computing environment 100 includes a plurality of components, such as a host 102, logic units 104 (e.g., logic unit 0, logic unit 1, logic unit 2, logic unit 3, such as a Direct Memory Access (DMA) engine or other type of device), local processor 106, memory controller 1 (108), memory controller 2 (110), and input/output devices 112, coupled via one or more communication buses (e.g., PCIe 120, PLB6 122 and AIB 124) and a controller 130 (e.g., PLB6 controller). Further, in accordance with an aspect of the present invention, PLB6 and AIB communicate with one another via a bridge 140.

In one particular example, host 102 and/or local processor 106 is a server, such as the System z server based on the z/Architecture offered by International Business Machines Corporation, Armonk, N.Y. One embodiment of the z/Architecture is described in an IBM® publication entitled, "z/Architecture Principles of Operation," IBM® Publication No. SA22-7832-10, Eleventh Edition, March 2015, which is hereby incorporated by reference herein in its entirety. However, host 102 and/or local processor 106 may be other servers and/or based on other architectures.

As indicated, in one example, multiple types of communication buses are included within the computing environment and are used to service requests between components. These multiple types of communication buses have differing characteristics. For instance, PLB6 communicates via 128 byte packets, while AIB employs a 2 kilobyte (kB) packet. Further, the formatting of fields within the packets is different. Other differences may also exist. Thus, in accordance with an aspect of the present invention, bridging logic (e.g., implemented as an ASIC in one embodiment) is employed to enable one type of communication bus to communicate with another type of communication bus.

Figure 2:
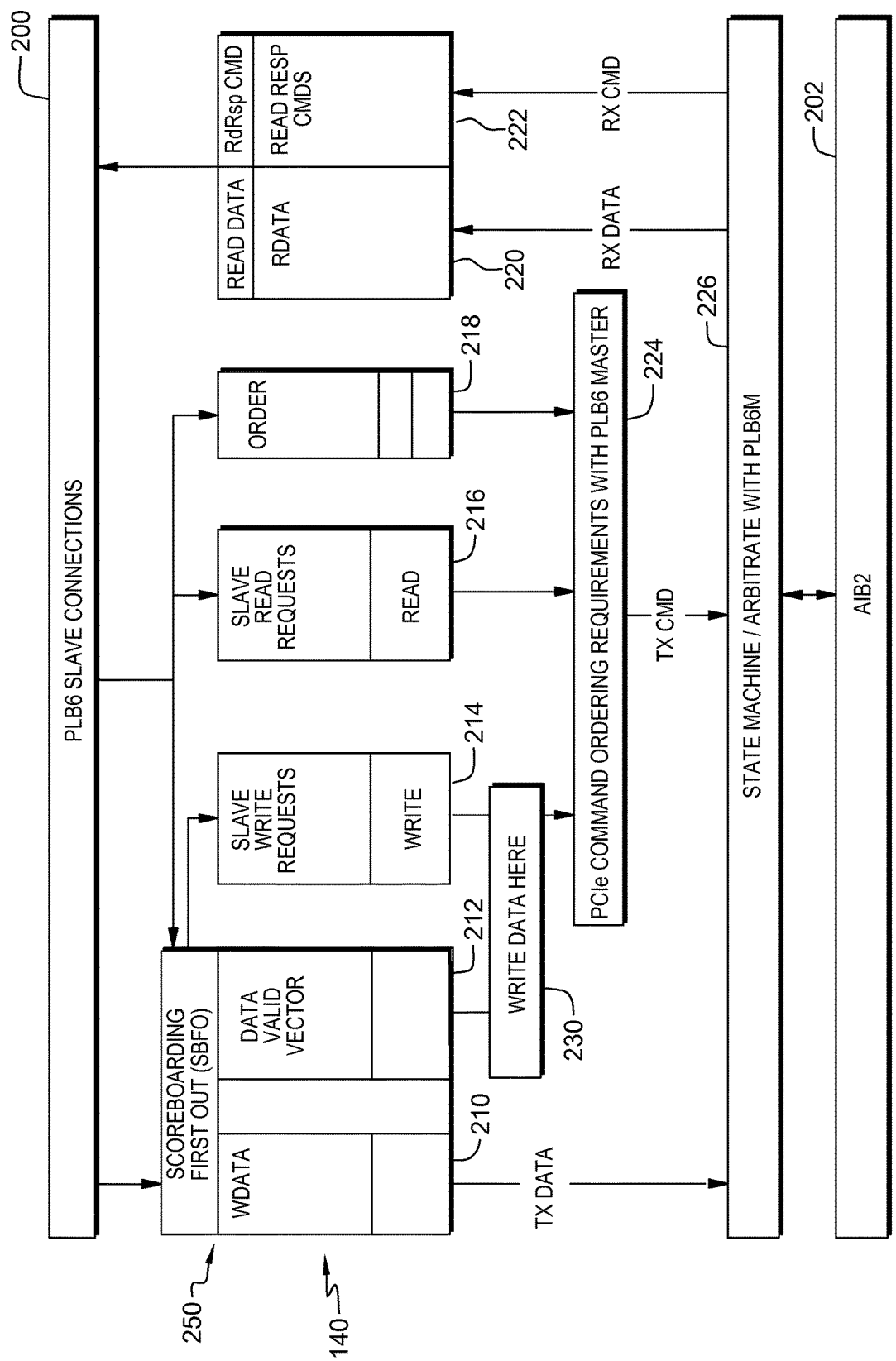
FIG. 2 depicts one embodiment of a bridge used to communicate between communication buses having differing characteristics in which one bus is a slave connection, in accordance with an aspect of the present invention.
Figure 3:
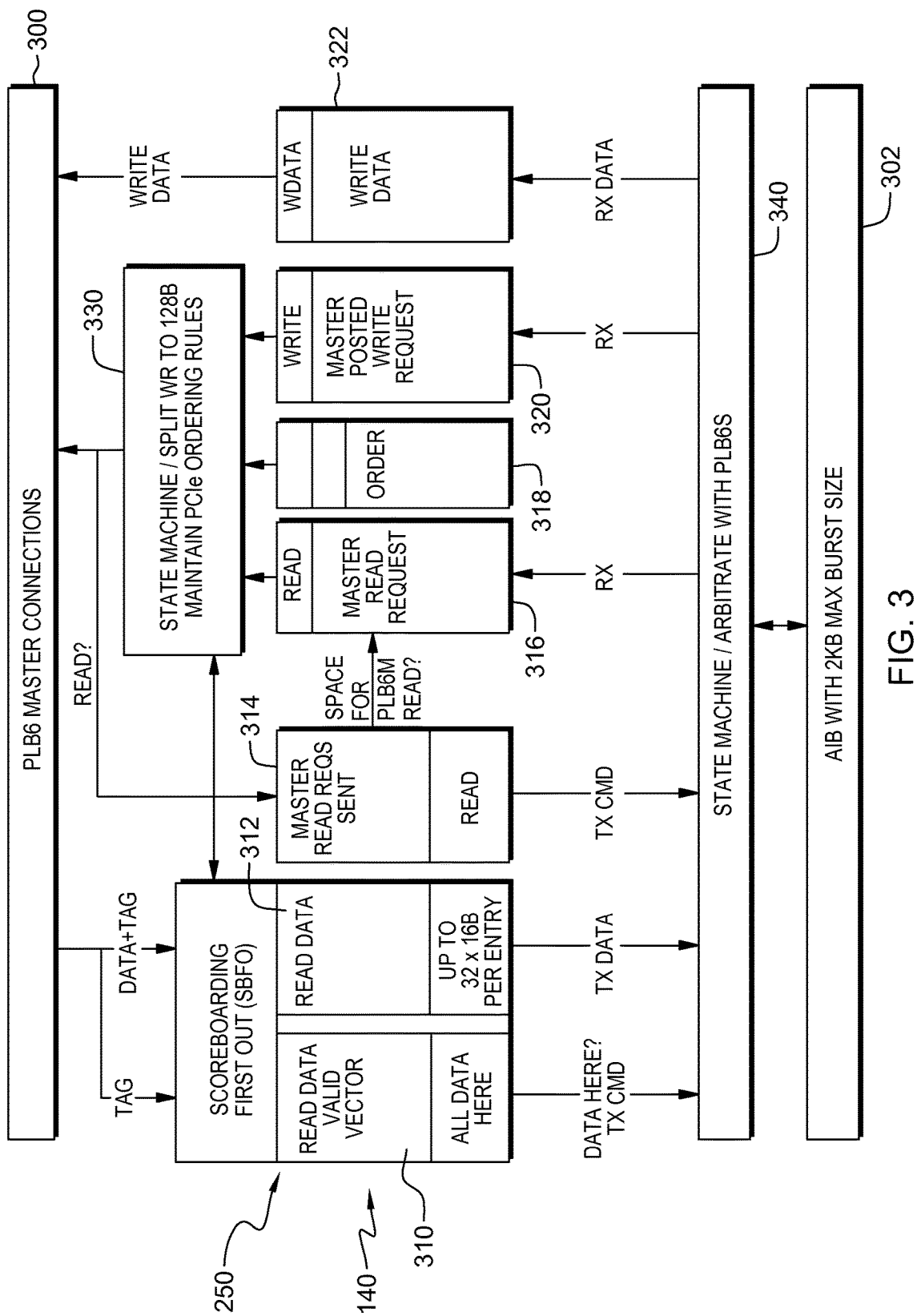
FIG. 3 depicts one embodiment of the bridge used to communicate between the communication buses in which one bus is a master connection, in accordance with an aspect of the present invention.
Figure 4:
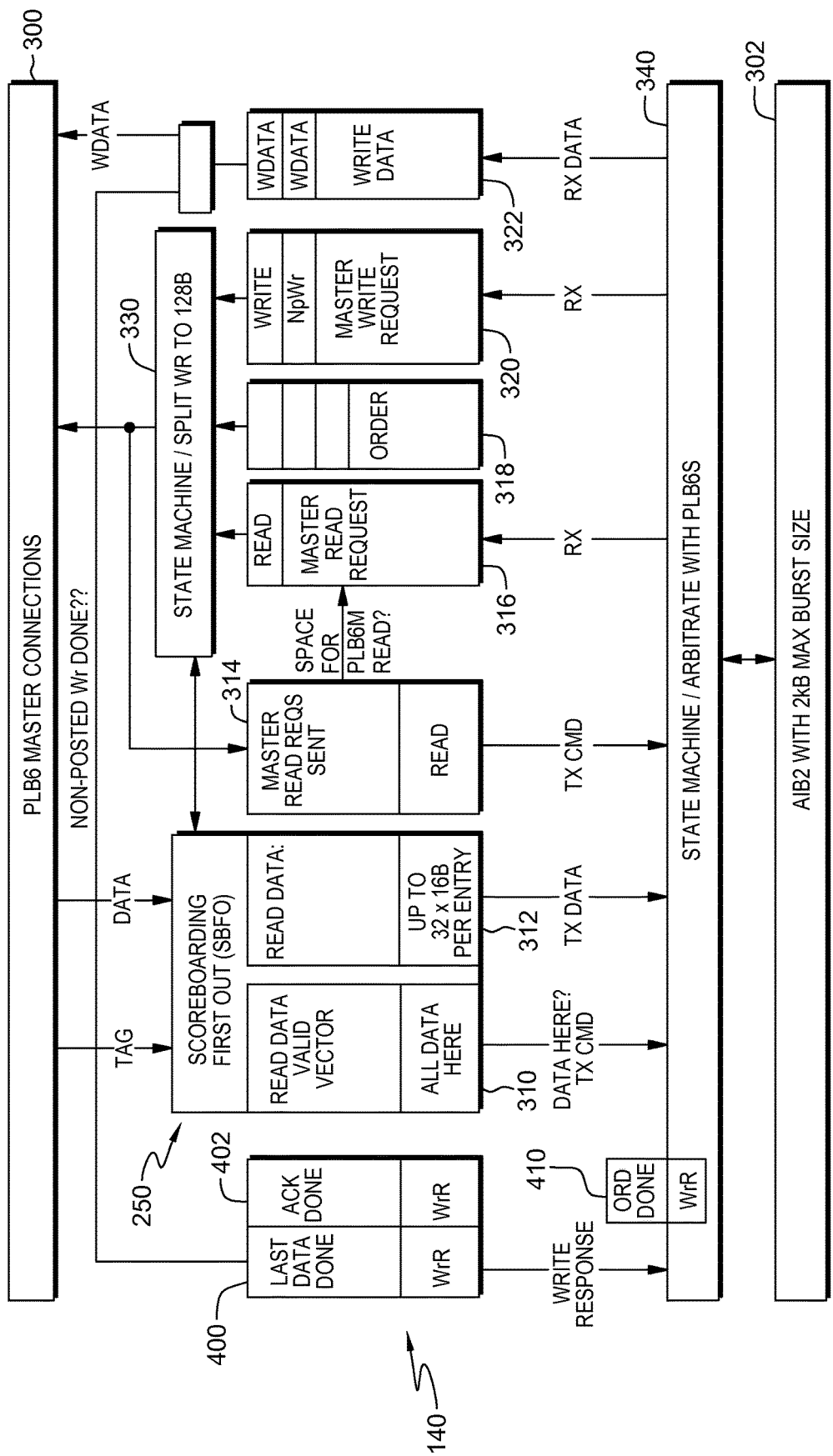
FIG. 4 depicts another embodiment of the bridge used to communicate between the communication buses in which one bus is a master connection, in accordance with an aspect of the present invention.
Figure 5:
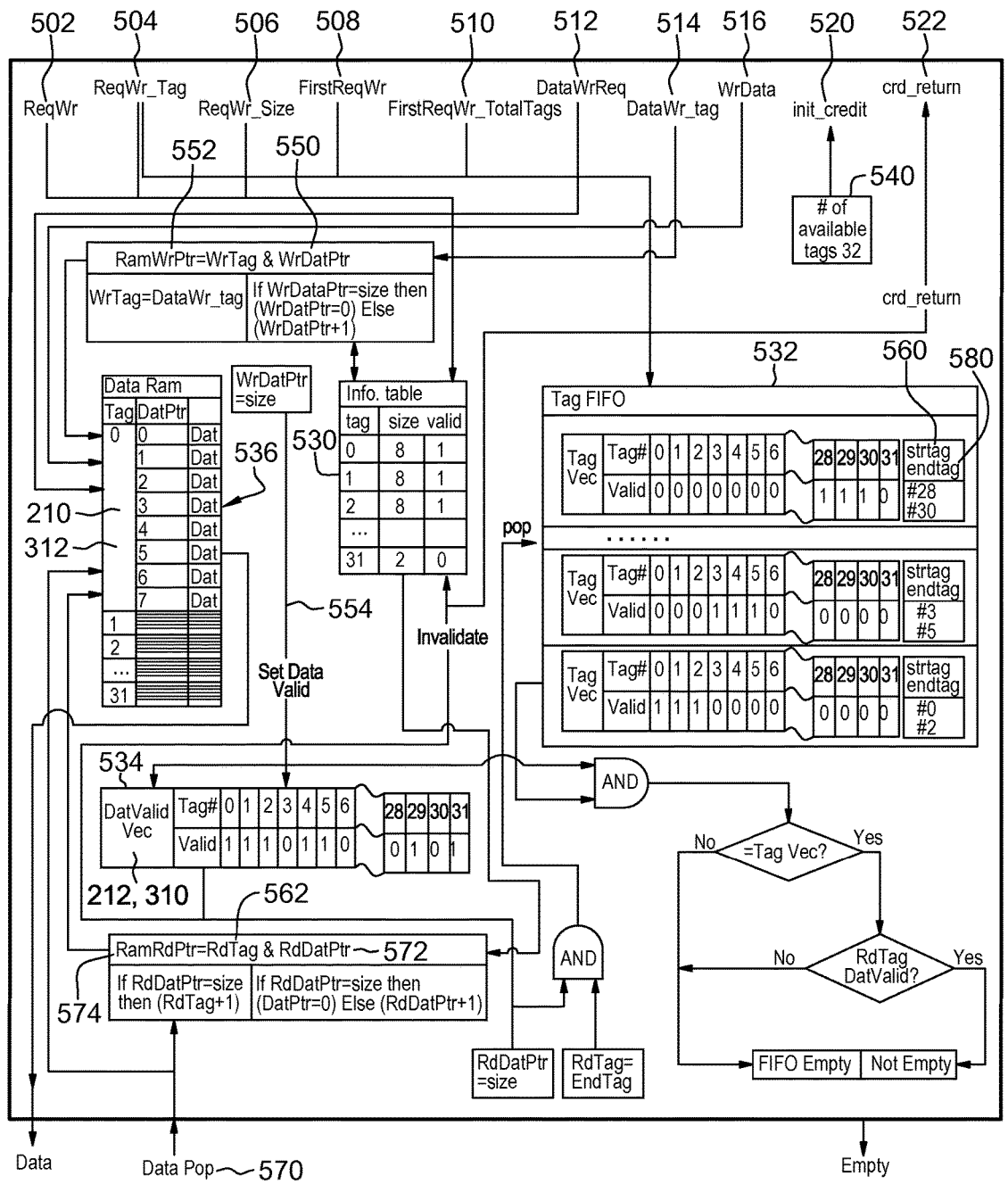
FIG. 5 depicts one example of various components of a ScoreBoarding First Out (SBFO) memory, in accordance with an aspect of the present invention.

Details relating to bridging between two communication buses having different characteristics are described with reference to FIGS. 2-5. In particular, FIG. 2 depicts one example of bridging between PLB6 and AIB when PLB6 is a slave connection; FIG. 3 depicts one example of bridging between PLB6 and AIB when PLB6 is a master connection; FIG. 4 depicts one example of bridging between PLB6 and AIB when PLB6 is a master connection and AIB provides a write response; and FIG. 5 provides details of a ScoreBoarding First Out (SBFO) memory used by the bridging logic, in accordance with an aspect of the present invention.

Referring to FIG. 2, details relating to processing read or write requests when bus 200 (e.g., PLB6) is a slave connection sending requests to bus 202 (e.g., AIB) on behalf of a master connection are described. For instance, with reference to FIG. 1, logic unit 0 sends a request to logic unit 1. PLB6 bus 122a coupled to logic unit 0 receives the request and sends the request to controller 130. Controller 130 determines, based on the target address in the request (i.e., the address of logic unit 1), that PLB6 bus 122b, coupled between controller 130 and bridge 140a, is to receive the request. This receiving bus 122b is considered a slave connection (or slave) and the sending bus 122a is considered a master connection (or master). Bus 122b provides the request to AIB bus 124a via bridge 140a. AIB bus 124a then provides the request to logic unit 1, which services the request. For instance, if it is a read request, logic unit 1 obtains the data and provides the data to logic unit 0 via the various buses and bridge; and if it is a write request, logic unit 1 stores the provided data.

Returning to FIG. 2, bridge 140a (as well as the other bridges 140), which is used to facilitate communications between bus 200 (e.g., bus 122b) and bus 202 (e.g., bus 124a) includes a plurality of buffers/vectors, such as a write data buffer 210 to include data to be written to the target address (e.g., logic unit 1); a data valid vector 212 used in conjunction with other components of a ScoreBoarding memory 250, described below, to determine when the data may be accessed by bus 202; a slave write requests buffer 214 to store write request commands received from bus 200; a slave read requests buffer 216 to store read request commands received from bus 200; an order buffer 218 used to determine the order of requests to be serviced; a read data buffer 220 to include data read responsive to a read request; and a read response command buffer 222 to store read responses. Buffer 210 and data valid vector 212 are part of a ScoreBoarding First Out (SBFO) memory 250 used in controlling access to the data, as described in further detail below. Buffers 214, 216 and 218 are coupled to an ordering determination component 224 used to determine which request is to be serviced next. Component 224 is further coupled to a state machine 226 used to translate the request and/or data into a format consistent with bus 202.

Further details relating to the operation of bridge 140 are described with reference to a read request (i.e., a request specifying a read command—referred to herein as a read request, a read command and/or a read command request) and a write request (i.e., a request specifying a write command—referred to herein as a write request, a write command and/or a write command request). Initially, the process of a read request is described.

In one example, bus 200 issues a slave read request, and since PLB6 communicates via 128 byte data units, the request may be for a maximum of 128 bytes of data. The request is stored in buffer 216, which is a first-in first-out buffer, assuming there is room in the buffer for the request. That is, buffer 216 has a predetermined number of entries that may be stored into by multiple masters (e.g., host 102, logic unit 0, local processor 106, etc.), and the request is stored if there is an available entry. It is stored in the buffer until bus 202 pops the request from the head of the buffer.

In particular, in one example, an indication of the read request is saved in order buffer 218, which is also a first-in first-out (FIFO) buffer. The empty signal for order FIFO 218 is lowered to indicate a command is available to be serviced. Ordering determination component 224, based on the FIFO 218 empty signal being low, checks order buffer 218 to determine the next command to be processed. In this example, it determines that a read command is the next command to be processed, and thus, selects a read command from slave read requests buffer 216. The read command selected is the next one in the buffer. Ordering determination component 224 provides the selected command to state machine 226, which converts the command in the PLB6 protocol to a command in the AIB protocol. This includes, for instance, placing the appropriate data in the appropriate fields. For instance, the fields include an address, command type, size, command tag, Master ID, etc. Subsequent to creating the appropriate command for bus 202, the command is made available to bus 202 (e.g., forwarded to, or otherwise obtained by bus 202), which provides the request to the target (e.g., logic unit 1).

At a later time, a read response command and read data are received by bus 202 from the target (e.g., logic unit 1) and forwarded to state machine 226, which converts the read response command and/or data to a format understood by bus 200. The converted command is then placed in read response command buffer 222, and the converted data corresponding to that read command is placed in read data buffer 220. Thereafter, bus 200 retrieves the command and the data, and forwards them to controller 130 which will facilitate sending the requested data to the requesting component (e.g., logic unit 0).

In addition to processing a slave read request, a slave write request may also be processed. In this example, logic unit 0 requests that data be written at logic unit 1. PLB6 122b receives the write request and provides it to bridge 140a. Bridge 140a checks whether the bridge can process (e.g., accept) the request, and in particular, the data to be written. For instance, in accordance with an aspect of the present invention, ScoreBoarding First Out memory 250 (also referred to herein as a scoreboard or scoreboarding) is used to determine whether the bridge may accept the request, and thus, the data.

As previously indicated, the scoreboard includes a write data buffer 210 that can store a predefined amount of data. For instance, it can store data for up to 32 128 byte requests. To track how many requests may be stored in the buffer, the scoreboard has a set of credits or tags. When the buffer is empty, there are 32 available tags. The number of tags is obtained by the PLB6 slave write logic and used to determine if the request may be accepted. If a tag is available for the request, then the tag is assigned to the request for the data transfer and the bridge may accept the request.

In a further example, assume three write request to store 128 bytes of data are received, each from different PLB6 masters (e.g., logic unit 0, logic unit 2, logic unit 3). A determination is made as to whether there are enough tags available. If there is at least one tag available, then the bridge indicates to bus 200 that it can accept the next write request. If there are three tags available, then all three write requests are accepted, etc.

If a write request is accepted, bus 200 places the write request on slave write requests buffer/FIFO 214 and places an indication of the write request on order buffer 218. The empty signal for order FIFO 218 is lowered to indicate the command is available to be serviced. Additionally, the data associated with the write request is written in write data buffer 210. However, the data for the write commands may not arrive in the order in which the write requests were accepted, and thus, to maintain order, the data is stored in a slot within the buffer corresponding to the tag assigned to the request. For instance, the slots in the buffer are in numerical order starting at 0 in one example, and the data for the command assigned tag 3 is stored in slot 3 of the buffer. Therefore, the SBFO presents the corresponding data to the AIB in the order in which the write commands were received. From the point of view of the AIB, the SBFO is just a FIFO. The complexity of handling out-of-order data and aligning the data with its corresponding command is performed by SBFO logic unbeknownst to the AIB.

As an example, to obtain the data by AIB bus 202, ordering determination component 224, based on the order FIFO 218 empty signal being low, checks order buffer 218 to determine the next type of request to be processed. In this example, it is determined it is a write request and the scoreboarding logic indicates that write data buffer 210 is not empty (i.e., the data for this write request at the head of FIFO 214 is available in data buffer 210). Therefore, a write request is taken from buffer 214, which is a FIFO buffer. Ordering determination component 224 forwards the command to state machine 226, which converts the command to a write command in a format consistent with bus 202. Further, state machine 226 obtains the data from buffer 210, and makes the data available to bus 202 (e.g., bus 202 receives the data, pulls the data from the buffer, or otherwise obtains the data).

In addition to slave requests, master read and write requests may be processed. For instance, assume logic unit 1 issues a read or a write request to memory controller 1 (108). The request is received by AIB bus 124a, it is processed by bridge 140a, further serviced by PLB6 bus 122b as a master connection, forwarded to controller 130, obtained by PLB6 bus 122c and issued to memory controller 1 (108).

Further details of the processing between AIB bus 124a, bridge 140a and PLB6 122b are described with reference to FIGS. 3 and 4.

Referring to FIG. 3, in this embodiment, bridge 140 includes, for instance, a read data valid vector 310 used to determine if the read data is valid; a read data buffer 312 used to include the data responsive to a read request; a master read requests sent buffer 314 used to maintain a list of the read requests sent; a read buffer 316 used for read commands; an order buffer 318 used to maintain the order of requests; a write requests buffer 320 that includes write commands; and a write data buffer 322 that includes data responsive to a write request. Data valid vector 310 and buffer 312 are included as part of SBFO 250. Further, bridge 140 includes a state machine 330 coupled to buffers 316, 318 and 320, and further coupled to bus 300 and scoreboard 250. Additionally, bridge 140 includes a state machine 340 coupled to the buffers and to bus 302.

In operation, bus 302 (e.g., AIB 124a) may send a read or a write request to bus 300 (e.g., PLB6 122b). In this example, bus 302 is able to communicate via 2 kB units of data, while bus 300 can only communicate via units of data that are a maximum of 128 bytes. When a read or a write request is presented on AIB, such request will be accepted because the AIB protocol negotiates command and data credits before issue requests. That means, when a request is issued on an AIB bus, its end point will accept it. State machine 340 issues a read command credit to the AIB bus based on the free space availability on master read request FIFO 316; and issues write command and data credit to the AIB bus based on the free space availability on the master (posted/non-posted) write requests FIFO 320 and write data FIFO 322, respectively.

In one example, when bus 302 issues a write request with the data to be written (up to 2 kB), the request and the data are received by state machine 340. In this example, the write request is a posted write. The state machine places the data in write data buffer 322 and places the write request in write buffer 320, each of which being a first-in first-out buffer. Additionally, an indicator is placed or set in order buffer 318, which is also a first-in first-out buffer, indicating this write request; this maintains the order of write and/or read requests coming from bus 302.

To process the write request, state machine 330 checks order buffer 318 and determines that a write request is the next request to be serviced. Thus, it pulls a write request from write command buffer 320. Assuming the write request has a size of 2 kB, it is split into sixteen write commands, each 128 bytes, and forwarded to or pulled by bus 300. Each of the sixteen commands is assigned a unique write command tag by state machine 330. Bus 300 sends the commands to controller 130, which forwards the commands to memory controller 1, via bus 122c in this particular example, based on the target address of the commands.

Memory controller 1 sends a tag back to bus 300 indicating that it can accept the data. The tag is used to make a data request for the data corresponding to the commands. When the data request is granted, the data stored in write data buffer 322 is sent in 128 byte units to bus 300, which further sends the data to controller 130. For example, bus 300 makes a data phase request to PLB6 controller 130, once the data phase is granted by PLB6 controller 130. Then, 128 bytes of data are popped from write data FIFO 322 and issued to the PLB6 bus along with the write data tag assigned by the slave. PLB6 master bus 300 will go through this process 16 times until all 2 kilobytes of data are moved to the PLB6 bus.

A write request may be a posted write or a non-posted write. When the write request is a non-posted write, there are different types of write responses that may be indicated in the write request from bus 302. This is described further with reference to FIG. 4

Referring to FIG. 4, for a non-posted write, order done 410 is set when the data is sitting in write data buffer 322; an acknowledge done 402 is indicated when all sixteen commands are accepted by the target and the target issues a tag indicating such; and a last data done 400 is set when the bridge receives an acknowledgment that all of the data has been received by the target. The different types of write completions are received by state machine 340 and arbitrated for handling.

Returning to FIG. 3, in addition to a write request, bus 302 may issue a read request. Responsive thereto, state machine 340 receives the request for 2 kB of read data, sets an indicator in order buffer 318 indicating the read request, and places the command in read buffer 316. The command is then sent to or otherwise obtained by state machine 330, which determines whether the command may be currently processed. For instance, the state machine determines that the 2 kB command is to be split into a plurality of 128 byte units (e.g., sixteen 128 byte commands), and thus, checks ScoreBoarding 250 to see whether there are enough tags to be assigned to the sixteen commands. If there are not enough tags, then processing of the command waits. However, if ScoreBoarding 250 indicates there are 16 tags available, then state machine 330 splits the command into 16 commands. Those commands are forwarded to or pulled by bus 300, which then forwards each command with its unique tag from ScoreBoarding 250 to controller 130. Controller 130 sends the commands via bus 122c to memory controller 1 (108) in this example.

The memory controller accepts the sixteen read requests and sends the data with the tag issued by bus 300 during the command phase. In particular, sixteen units of data are forwarded, each with a unique tag captured during the command phase. The data is stored in the scoreboarding memory (e.g., read data buffer 312) at a location based on the tag. For instance, if the assigned tag is tag 2, then the data is stored in slot 2 of the buffer, which has slots in numerical order beginning at 0, in this example. Further, the read command is stored in master read requests sent buffer 314. ScoreBoarding logic 250 determines whether all of the data for all of the 16 commands to be processed is received. If it is, the read data valid vector of all the tags are set and in conjunction with other components in the scoreboard, the empty bit is lowered if this is the next AIB read data to be returned. The data is retrieved by state machine 340, and the state machine creates a single 2 kB data unit from the 16 data units. It makes the data available to bus 302.

A subsequent AIB read command can be issued if enough tags are available once the previous 16 read request commands are issued and before any of its data is returned. For instance, a next AIB read command may be for 1 kB of data, and then 8 tags would be needed from SBFO. If the 8 tags are assigned, then a total of 24 tags are outstanding, and any of these tags can be returned with its corresponding data in any order. As examples, 128 bytes of data for the second AIB command (1 kB) can be returned before any data for the first AIB command (2 kB) or before all of the data for the first AIB command. SBFO will store the data to the appropriate data slot by using the read data tag that was previously assigned by the master during the command phase. SBFO presents the corresponding data to the AIB in the order of which the read commands were received. From the point of view of the AIB, the SBFO is just a FIFO. The complexity of handling out-of-order data and aligning the data with its corresponding command are performed by SBFO logic unbeknownst to the AIB.

Further details relating to scoreboarding are described with reference to FIG. 5. In one embodiment, ScoreBoarding first out memory (SBFO) 250 includes a plurality of inputs, such as, for instance, a ReqWr (a request write) 502, a ReqWr_Tag (a request write tag) 504, a ReqWr_size (a request write size) 506, a FirstReqWr (a first request write) 508, a FirstReqWr_totalTags 516, a DataWrReq (a data write request) 512, a DataWr_tag (a data write tag) 514, and a WrData (write data) 516. Also, it includes a plurality of outputs such as, for instance, an init_credit 520 and a crd_return (credit return) 522.

Further, in one embodiment, ScoreBoarding first out memory 250 includes an information table 530 that stores the request size for a corresponding tag that was issued and a valid indicator that indicates whether the entry is valid; a tag first-in, first-out buffer (Tag FIFO) 532 that is a first-in first-out buffer used to store tag vectors; a data valid vector 534 (e.g., vectors 212 and 310) that indicates all data associated with the tag is valid in the data RAM (random access memory); and a data RAM 536 (e.g., buffers 210, 312), which is data storage in which 128 bytes is allocated for each tag; each tag uses 8 data entries, and each entry stores 16 bytes of data.

In operation, for a slave write, as a particular example, the following may occur in one embodiment. Reference is made to FIGS. 2 and 5. A write request comes in to bus 200, and PLB6 slave 200 looks at the credit that was initially given by scoreboard logic 250 through initial credits 540 to determine if there are enough tags available for this request. For instance, if the request is a 128 byte request, then 1 tag is needed. Since there are 32 available tags, the write request may be accepted and acknowledgment along with a write data tag is returned to bus 200. This write data tag will be used by the PLB6 master to send corresponding write data during the data phase. Bus 200 stores the request in slave write requests buffer 214 and an indication of the request in order buffer 218. Further, the credits are decremented by the number of tags provided. When bus 200 is ready to send the data to the scoreboard (e.g., store the data in write data buffer 210, also known as data RAM 536), it will use the tag that came with the data phase to write the data into the write data buffer. Scoreboard 250 returns a credit via crd_return 522 to PLB6 slave 200 if all the data for the tag got popped by AIB bus 202.

For instance, as shown in FIG. 5, data RAM 536 includes a plurality of entries for each tag. For instance, tag 0 has eight entries associated therewith, each one capable of storing up to 16 bytes of data. Therefore, each tag has associated therewith 128 bytes of data, in this embodiment. The data associated with tag 0 is then written in entries 0-7 associated with the tag. Each entry of a tag is identified by a data pointer (e.g., DatPtr 0-7). The tag is further stored in information table 530. Information table 530 includes the tag as an index, the number of data entries associated with the tag, and a valid indicator, which when set to one indicates the information table entry is valid.

The tag is also used in tag FIFO 532. For each tag used, the bit associated with that tag would be set to one. Further, the starting and ending tags are indicated. For instance, if one tag is used, the starting and ending tags may be zero; and if sixteen tags are used, the starting and ending tags may be zero and fifteen, as examples.

When the data starts to arrive, the tag and data pointer are used to store the data in RAM 210/536. The data starts at data pointer 0 of its assigned tag, e.g., tag 0, in which 16 bytes of data are stored in that entry. Once the first 16 bytes are stored, then the data pointer is incremented by 1, and the next 16 bytes are stored, until up to 128 bytes are stored for the tag. Once WRDatPtr is equal to the size indicated in the information table (e.g., 8 in this example), then the indicator for that tag is set equal to one in DatValid vector 534. For instance, if 8 entries of data are to be stored for tag 0 (as indicated in information table 530), then when the 8 entries are stored, the valid indicator in data valid vector 534 for tag 0 is set to one. The scoreboarding logic ANDs the data valid vector with the tag vector at the head of Tag FIFO 532, and uses the result to compare the tag vector at the head of Tag FIFO, and if they are equal, then all the data for that tag is in the write data buffer.

When all the data for the request is available in the write data buffer, RdTag 562 is used to retrieve the valid bit from data valid vector 534. The empty signal is lowered if the data valid vector indicates '1' for current RdTag 562. Then, when the request is eligible to be processed (based on ordering), bus 202 issues a pop command to pop the first entry off of the FIFO write data buffer. That is, to bus 202 the write data buffer is just a FIFO buffer and when it receives an indication that the data is there, it issues a pop command to retrieve the data. It is unaware of the logic in the scoreboard that is used to ensure proper ordering. The scoreboarding logic uses the starting tag, which is obtained from the tag FIFO when the pop command is received, with a read pointer that starts at zero and combined they act as a read data pointer that indexes into the RAM to obtain the data. Each time bus 202 issues a pop command, the read pointer is incremented by one. Once the read data pointer is equal to the size indicated in the information table, then all of the data for the tag is read. Thus, the indicator in the data valid vector for tag 0 is invalidated (e.g., set to zero) and a credit return pulse is sent to PLB6 slave 200 and index 0 of the information table is invalidated. Additionally, the tag vector is removed from the tag FIFO since only one tag was used and RdTag equals EndTag (e.g., both are zero) in this example. The empty signal is asserted if the data for the next request is not available.

In addition to the slave write request, the scoreboard is used for a master read request. One embodiment of the logic associated with a master read request is described with reference to FIG. 5, as well as with reference to FIG. 3. In this example, bus 302 issues a read request that is 2 kB, and that read request is divided by state machine 330 into sixteen 128 byte commands. Each of the sixteen commands requires a tag, and therefore, bus 300 looks at the credit that was initially given by the scoreboard logic 250 through initial credits 540 to determine if sixteen tags are available. If there are sixteen tags available, then bus 300 will issue the sixteen requests out. Bus 300 decrements the credit count by 16. The tag vector is used to indicate that there are sixteen tags (e.g., tags 0-15) being used and scoreboarding logic pushes the tag vector into Tag FIFO 532. Also, each tag is used as an index to store its size (e.g., 8, since 8 entries needed for 128 bytes) and its valid indicator in information table 530.

When the read data is returned, it may be returned for any of the commands in any order. Assume the data for tag 8 is returned first, then it is stored in the proper location in data RAM for tag 8 (e.g., location 9), as determined by Wrtag&WrtDatPtr. WrtDatPtr is initialized to zero.

At bus 302, it appears that read data buffer 312 is empty, since it is to read the data in order and the data for tag 0 has not been stored yet. Thus, even though the data for tag 8 is stored, the buffer appears empty to bus 302. When the data for all sixteen tags are stored (e.g., tags 0-15), then DatValid vector 534 for tag 0 to tag 15 will be set to '1'. The empty is lowered as long as the DatValid Vector indicates valid for current Read Tag 562. If Order FIFO 318 indicates the next command is a read, then bus 302 may issue a pop command to obtain the data off of the buffer. Every pop command obtains sixteen bytes of data from the buffer and the RdDatPtr is incremented by one. When the read data pointer is equal to the size obtained from information table 530, the read tag 562 is incremented by one and the read data pointer is initialized to 0. The indicator in the data valid vector and information able for the corresponding tag is invalidated (e.g., set to zero) and a credit return pulse is sent to bus 300. This occurs until the data for all of tags for this request has been obtained. Further, the tag vector is removed from the tag FIFO when RdTag equals EndTag, which is 15 in this example. The empty signal is asserted if the data for the next request is not available.

To further explain the logic associated with the scoreboarding FIFO, from the perspective of the scoreboard, the following may occur for a slave write or a master read request, in one embodiment:

1. SBFO advertises the init_credit 520 (number of total tags, which is 32 tags in one example).
2. User makes "FirstReqWr" 508 along with "ReqWr_Tag" 504 and "FirstReqWr_totalTags" 510 to SBFO to indicate the beginning of the tag and total tags needed for the current transaction.
3. SBFO uses "RegWr_tag" 504 and "FirstReqWr_totalTags" 510 and decodes that information into a 32 bit Tag Vector along with the Start and End Tag numbers and stores it into Tag FIFO 532.
4. SBFO also stores the requested tag transfer size (ReqWr_size) 506 into information table 530 using the Requested Tag (ReqWr_tag) 504 as an index, each time ReqWr 502 is active.
5. SBFO uses the DataWr_tag 514 to index into information table 530 to retrieve the corresponding transfer size when DataWrReq 512 is active. WrDatPtr 550 increases by 1 every cycle when DataWrReq 512 is active.
6. DataWr_tag 514 and WrDatPtr 550 forms the RamWrPtr 552 to store WrData into Data Ram 536. WrDataPtr resets to '0' when WrDatPtr equals size.
7. When WrDatPtr 550 equals size, the valid bit is turned on 554 for the corresponding tag in DatValid Vec 534.
8. DatValid vector 534 is logic ANDed with a Tag Vector from Tag FIFO 532, and the result is compared against the Tag Vector. If both are equal, this indicates all data for the valid tag of the Tag vector are available in Data Ram 536.
9. SBFO use Strtag 560 from Tag FIFO as the starting of RdTag 562.
10. SBFO empty signal is lowered if DatValid vector 534 indicates valid for current RdTag 562 and the result from step 8 indicates equal.
11. SBFO uses the RdTag to index into the information table 530 to retrieve the corresponding transfer size.
12. Every cycle Datapop 570 is active, RdDatPtr 572 is increased by 1 and reset to 0 when RdDatPtr equals the size.
13. RdTag 562 is increased by 1 when RdDatPtr 572 equals the size.
14. RdTag 562 and RdDatPtr 572 form the RamRdPtr 574 to read data from Data Ram 536.
15. When RdDatPtr 572 equals the size, the valid bit is lowered for the corresponding Tag in DatValid Vector 534.
16. When the RdDatPtr 572 equals the size, the valid bit is lowered for the corresponding Tag in Info. Table 530.
17. When RdDatPtr 572 equals the size, a crd_return pulse 522 is issued.
18. When RdDatPtr 572 equals the size and RdTag 562 equals Endtag 580 from Tag FIFO 532, the Tag Vector is popped from Tag FIFO.

Described in detail herein is a scoreboarding technique that includes logic circuits to maintain order in servicing requests between buses that have differing characteristics. This logic is not known to the bus reading or writing the data. That is, the bus is absent knowledge of such logic. This logic is implemented, in one example, as circuits on a physical chip, and is referred to herein as a device, a processing device, or a hardware device.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 6:
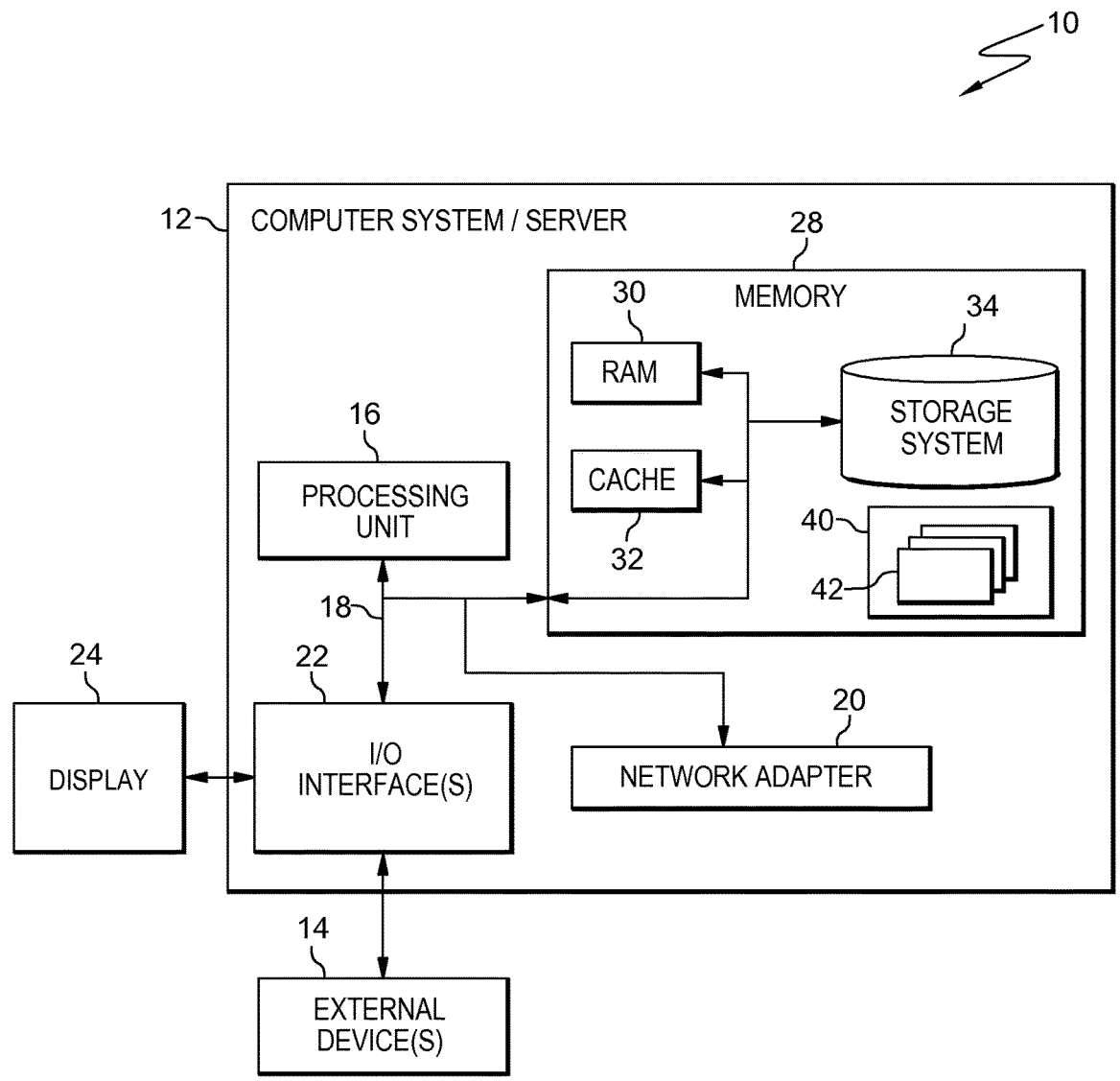
FIG. 6 depicts one embodiment of a cloud computing node.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
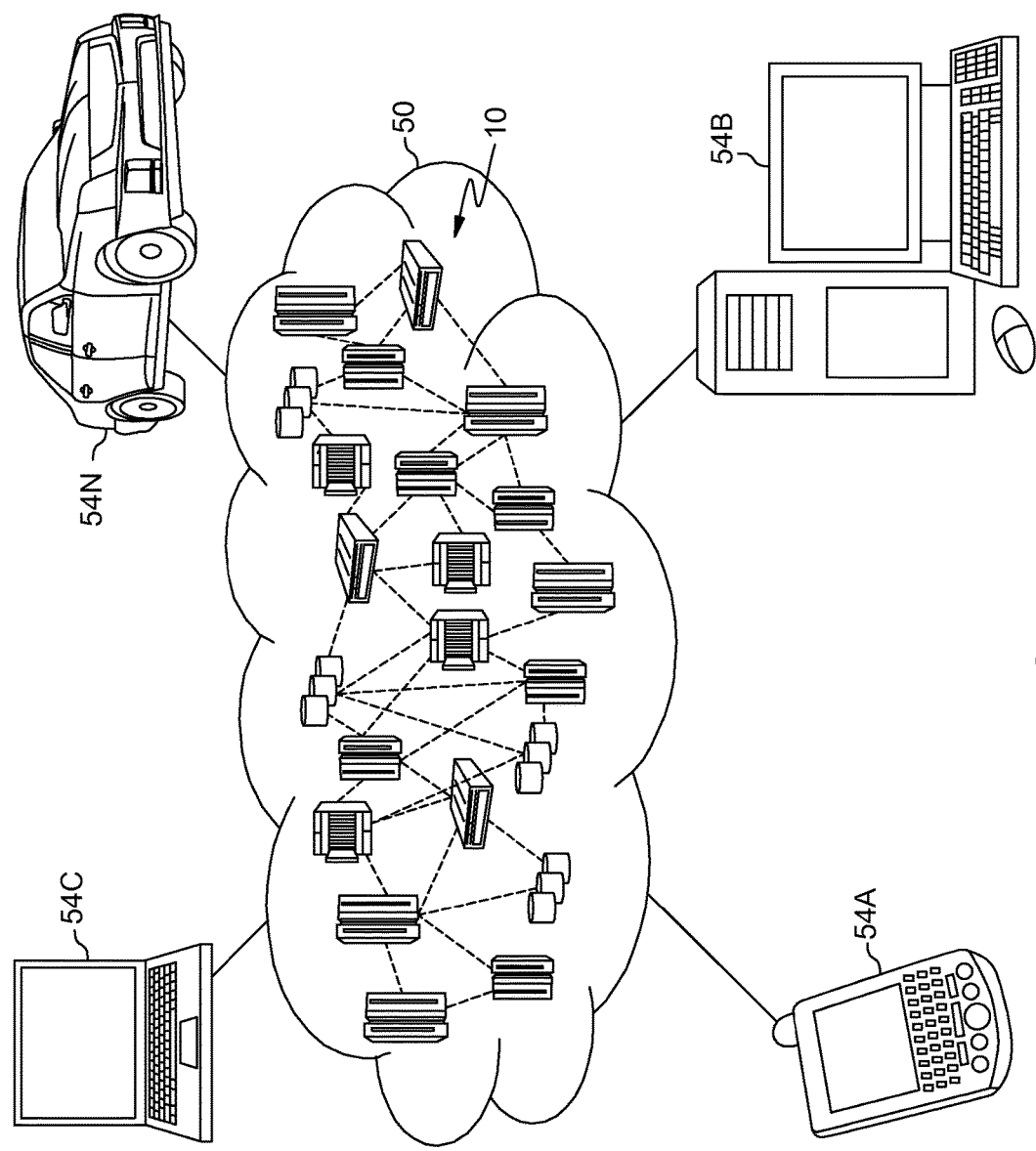
FIG. 7 depicts one embodiment of a cloud computing environment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
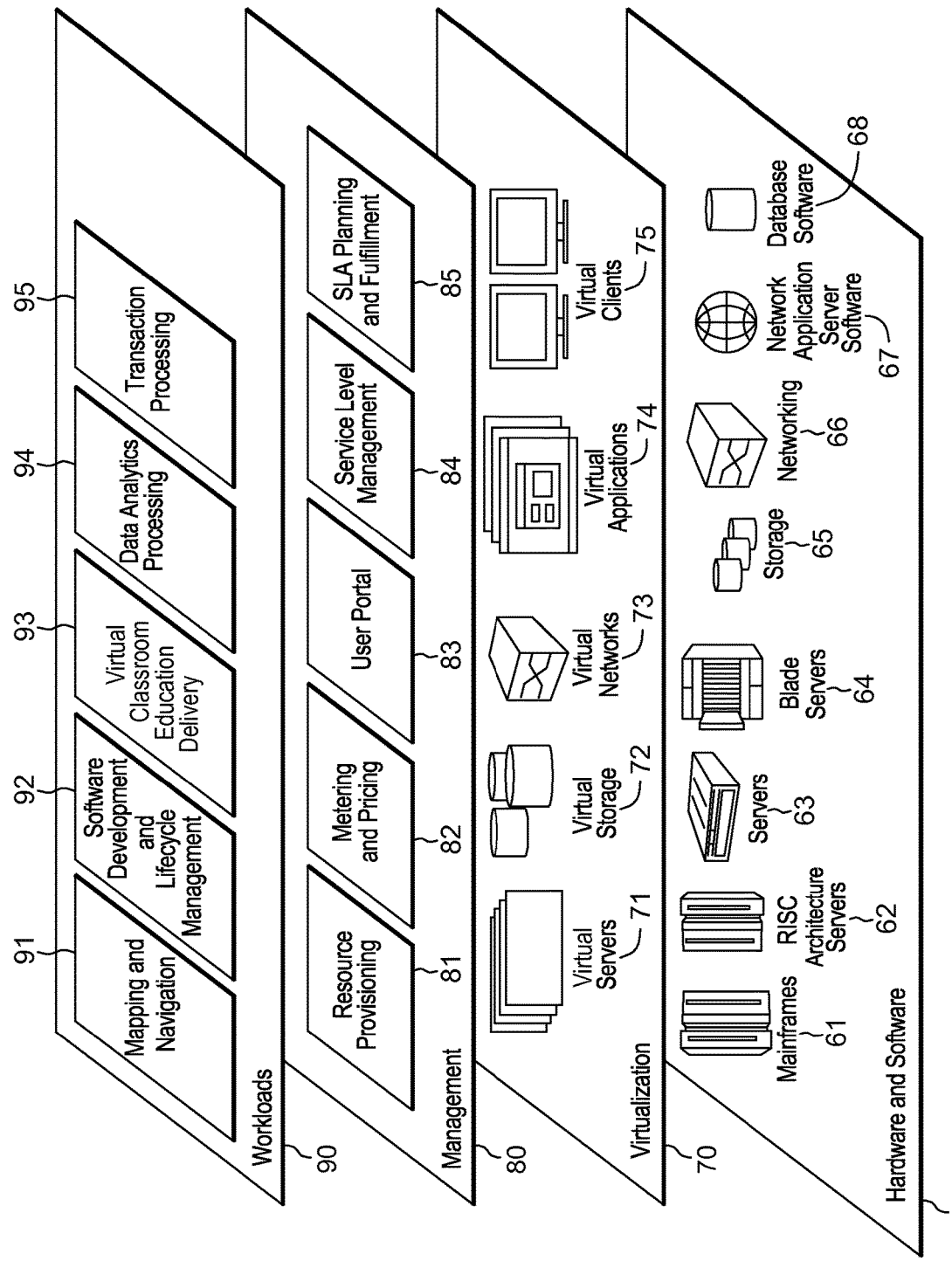
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method of communicating between communication buses of a computing environment, the method comprising:
   receiving, by a bridge implemented at least in part in hardware, a request, the bridge coupled between one communication bus having a first set of characteristics and another communication bus having another set of characteristics different from the one set of characteristics, the bridge comprising a scoreboard to be used in servicing the request, the scoreboard including a plurality of tags to be assigned to one or more requests and one or more buffers to store data, wherein a buffer of the one or more buffers used in servicing the request includes a plurality of slots to store data, a slot comprising one or more entries in the buffer;

determining by the bridge whether the request is to be processed, the determining using the scoreboard;

based on determining the request is to be processed, initiating processing of the request, and assigning at least one tag of the plurality of tags to the request;

storing data associated with the request in the buffer, wherein the data is stored in one or more slots of the plurality of slots of the buffer, the one or more slots being selected based on the at least one tag assigned to the request, wherein the data is received in any order, but stored in the buffer in order based on the request; and controlling access to the data by the other communication bus, the controlling access using the scoreboard and comprising:

determining whether the other communication bus is to have access to the data in the buffer;

based on determining the other communication bus is to have access to the data, providing the other communication bus with access to the data; and based on determining the other communication bus is not to have access to the data, preventing access to the data via an empty indication of the buffer regardless of whether the buffer is empty, wherein the preventing access comprises determining whether data is available in the buffer for a selected tag of the plurality of tags, the selected tag chosen based on an ordering of requests to be serviced, and preventing the access via the empty indication of the buffer, based on the data for the selected tag being unavailable even if data for one or more other tags of the plurality of tags is available in the buffer.

2. The method of claim 1, wherein the determining whether the other communication bus is to have access comprises determining whether data for a first tag, in numerical order, assigned to the request is stored in the buffer, wherein based on the data being stored in the buffer, access is to be granted.

3. The method of claim 1, wherein the request is a write request obtained by the bridge from the one communication bus.

4. The method of claim 1, wherein the request is a read request obtained by the bridge from the other communication bus, and wherein the one communication bus is employed to obtain the data to be stored in the buffer.

5. The method of claim 4, wherein the data to be stored in the buffer based on the read request may be received out of order, but stored in order in the buffer using the at least one tag assigned to the request.

6. The method of claim 1, wherein the determining whether the request is to be processed comprises:

determining a number of tags to be assigned to the request, a tag indicating available space in the buffer; and determining the request is to be processed based on the number of tags being available for assigning to the request.

7. The method of claim 6, wherein the buffer comprises one or more entries for each tag, wherein an entry is to store a specified amount of data.

8. The method of claim 1, wherein the receiving comprises receiving a plurality of write requests in a particular order from the one communication bus, and wherein the method further comprises:

receiving data for each write request of the plurality of write requests, wherein data for at least one write request is received out-of-order from the particular order of the plurality of write requests; and storing the data received in the buffer in the particular order regardless of whether the data is received out-of-order; and wherein the controlling access presents the data to the other communication bus in the particular order.

9. The method of claim 1, wherein the request includes a read command, and wherein the method further comprises:

splitting the read command into a plurality of read commands based on availability of a number of tags to be assigned to the plurality of read commands;

receiving data for each read command of the plurality of read commands, wherein data for at least one read command is received out-of-order from the particular order of the plurality of read commands; and storing the data received in the buffer in the particular order regardless of whether received out-of-order.

10. The method of claim 1, further comprising receiving another request, the other request being a non-posted write request, and wherein the method further comprises providing one of the following write completion responses upon completion of the non-posted write request:

setting an order done based on data for the non-posted write request being in a write data buffer used for non-posted requests;

indicating an acknowledge done based on a plurality of commands resulting from splitting the non-posted write request being accepted by a target bus; and setting a last data done indicator when the bridge receives an acknowledgment that data that is expected to be received by the target bus has been received by the target bus.

11. A system for communicating between communication buses of a computing environment, the system comprising:

one communication bus having a first set of characteristics and another communication bus having another set of characteristics different from the one set of characteristics; and a bridge coupled between the one communication bus and the other communication bridge, the bridge implemented at least in part in hardware, and including memory and logic circuits, said system configured to perform a method, said method comprising:

receiving by the bridge a request, the bridge comprising a scoreboard to be used in servicing the request, the scoreboard including a plurality of tags to be assigned to one or more requests and one or more buffers to store data, wherein a buffer of the one or more buffers used in servicing the request includes a plurality of slots to store data, a slot comprising one or more entries in the buffer;

determining by the bridge whether the request is to be processed, the determining using the scoreboard;

based on determining the request is to be processed, initiating processing of the request, and assigning at least one tag of the plurality of tags to the request;

storing data associated with the request in the buffer, wherein the data is stored in one or more slots of the plurality of slots of the buffer, the one or more slots being selected based on the at least one tag assigned to the request, wherein the data is received in any order, but stored in the buffer in order based on the request; and controlling access to the data by the other communication bus, the controlling access using the scoreboard and comprising:

determining whether the other communication bus is to have access to the data in the buffer;

based on determining the other communication bus is to have access to the data, providing the other communication bus with access to the data; and based on determining the other communication bus is not to have access to the data, preventing access to the data via an empty indication of the buffer regardless of whether the buffer is empty, wherein the preventing access comprises determining whether data is available in the buffer for a selected tag of the plurality of tags, the selected tag chosen based on an ordering of requests to be serviced, and preventing the access via the empty indication of the buffer, based on the data for the selected tag being unavailable even if data for one or more other tags of the plurality of tags is available in the buffer.

12. The system of claim 11, wherein the determining whether the other communication bus is to have access comprises determining whether data for a first tag, in numerical order, assigned to the request is stored in the buffer, wherein based on the data being stored in the buffer, access is to be granted.

13. The system of claim 11, wherein the request is a write request obtained by the bridge from the one communication bus.

14. The system of claim 11, wherein the request is a read request obtained by the bridge from the other communication bus, and wherein the one communication bus is employed to obtain the data to be stored in the buffer.

15. The system of claim 14, wherein the data to be stored in the buffer based on the read request may be received out of order, but stored in order in the buffer using the at least one tag assigned to the request.

16. The system of claim 11, wherein the determining whether the request is to be processed comprises:

determining a number of tags to be assigned to the request, a tag indicating available space in the buffer; and determining the request is to be processed based on the number of tags being available for assigning to the request.

17. The system of claim 16, wherein the buffer comprises one or more entries for each tag, wherein an entry is to store a specified amount of data.

18. The system of claim 11, wherein the receiving comprises receiving a plurality of write requests in a particular order from the one communication bus, and wherein the method further comprises:

receiving data for each write request of the plurality of write requests, wherein data for at least one write request is received out-of-order from the particular order of the plurality of write requests; and storing the data received in the buffer in the particular order regardless of whether the data is received out-of-order; and wherein the controlling access presents the data to the other communication bus in the particular order.

19. The system of claim 11, wherein the request includes a read command, and wherein the method further comprises:

splitting the read command into a plurality of read commands based on availability of a number of tags to be assigned to the plurality of read commands;

receiving data for each read command of the plurality of read commands, wherein data for at least one read command is received out-of-order from the particular order of the plurality of read commands; and storing the data received in the buffer in the particular order regardless of whether received out-of-order.

20. The system of claim 11, further comprising receiving another request, the other request being a non-posted write request, and wherein the method further comprises providing one of the following write completion responses upon completion of the non-posted write request:

setting an order done based on data for the non-posted write request being in a write data buffer used for non-posted requests;

indicating an acknowledge done based on a plurality of commands resulting from splitting the non-posted write request being accepted by a target bus; and setting a last data done indicator when the bridge receives an acknowledgment that data that is expected to be received by the target bus has been received by the target bus.

* * * * *